Feb. 6, 1923.
J. F. KEY.
DEVICE FOR INFLATING TIRES.
FILED MAY 24, 1920.
1,444,188
2 SHEETS-SHEET 2
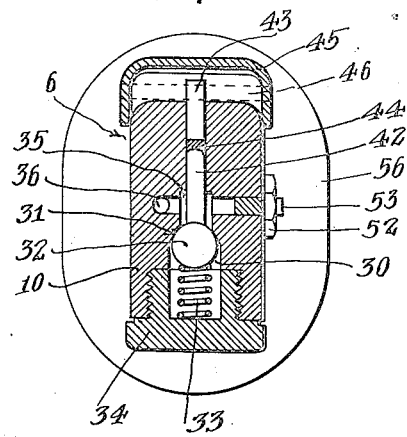
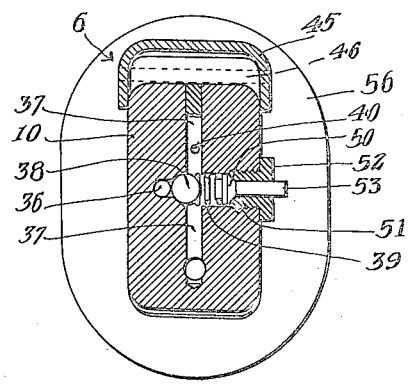
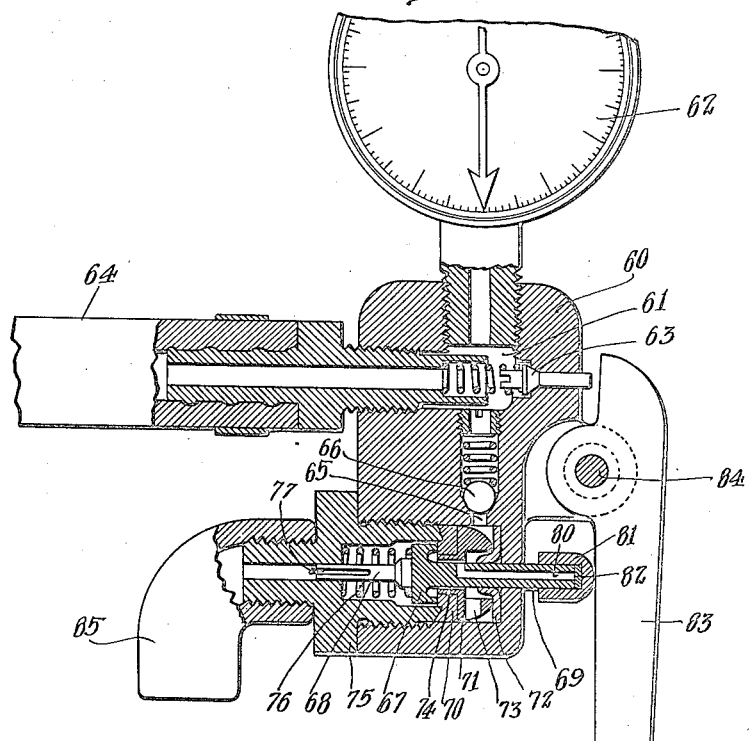
INVENTOR.
James F. Key.
Frederick Shyon
ATTORNEY Patented Feb. 6, 1923.

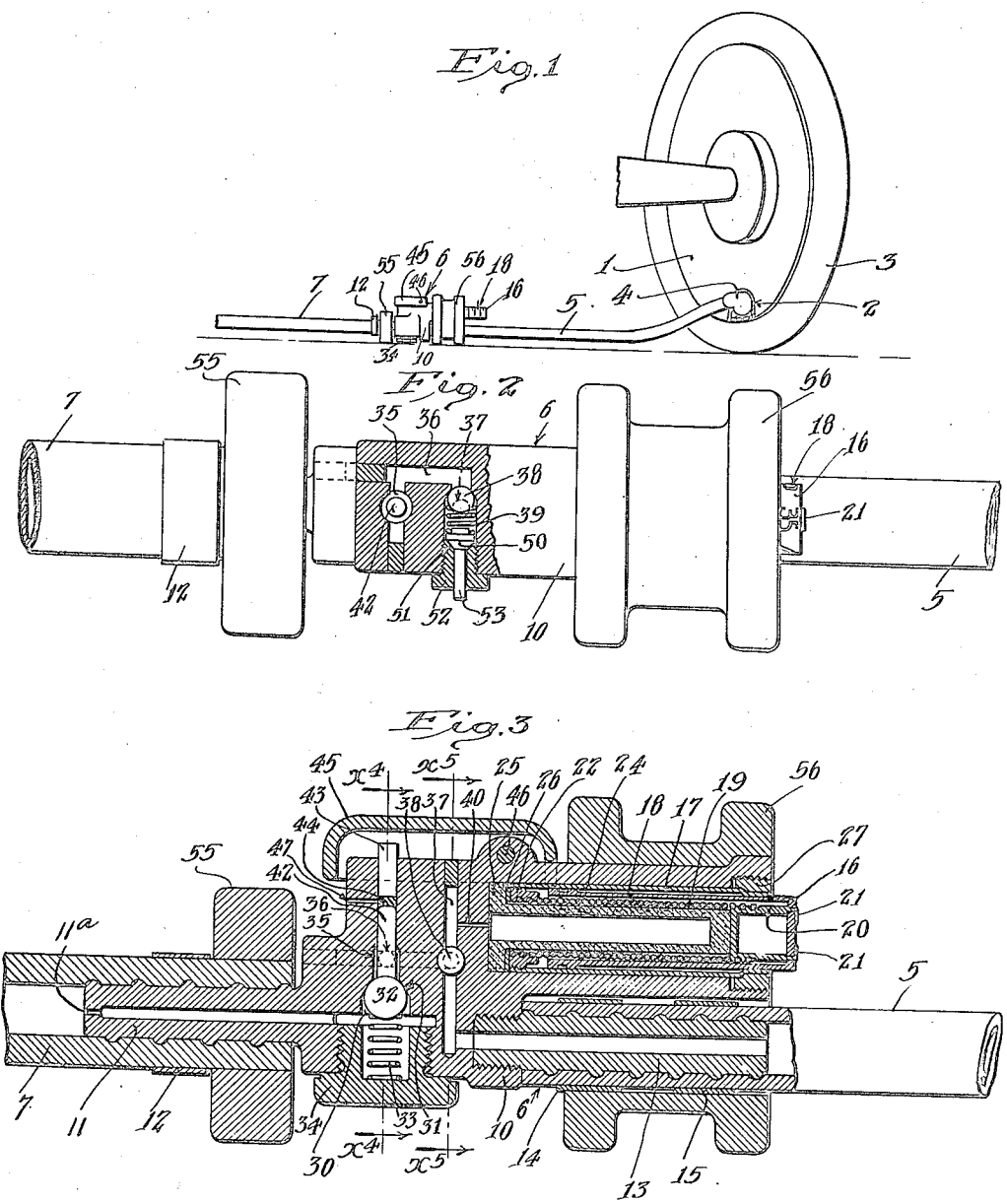

1,444,188

UNITED STATES PATENT OFFICE.

JAMES F. KEY, OF SIERRA MADRE, CALIFORNIA, ASSIGNOR, BY DIRECT AND MESNE ASSIGNMENTS, TO FIRST TRUST AND SAVINGS BANK OF PASADENA, AS TRUSTEE.

DEVICE FOR INFLATING TIRES.

Application filed May 24, 1920. Serial No. 383,932.

*To all whom it may concern:*

Be it known that I, JAMES F. KEY, a citizen of the United States, residing at Sierra Madre, in the county of Los Angeles and State of California, have invented a new and useful Device for Inflating Tires, of which the following is a specification.

This invention relates to a device for inflating automobile tires and is particularly directed to a flexible air line including a valve and pressure indicating unit adapted to direct compressed air to a tire and to the pressure indicator to obtain a pressure reading of the air supply and operable to cut off the air supply to obtain a direct reading of the air pressure in the tire.

The object of the invention is to provide a flexible air line having a coupling for attaching to the tire valve stem, and to provide a valve and pressure indicating mechanism incorporated in said air line and operable to direct compressed air to the tire and pressure indicator or to cut off the air supply to obtain a direct reading of the air pressure in the tire.

Another object is to provide a valve mechanism having an air supply valve controlling the passage of air to a tire and provided with means for by-passing air escaping past said valve when closed, to the atmosphere.

Another object is to provide means for releasing the air in the tire to decrease the pressure thereof and to obtain a reading of said decreasing pressure.

Various other objects and advantages will be more fully apparent from the following description of the accompanying drawings, which form a part of this disclosure, and which illustrate a preferred form of embodiment of the invention.

Of the drawings:

Figure 1 is a perspective view of the device of the present invention in use.

Fig. 2 is an enlarged top plan view of the control unit partly in section.

Fig. 3 is a vertical longitudinal section through said unit.

Fig. 4 is a transverse vertical section on line $x^4$—$x^4$ of Fig. 3.

Fig. 5 is a transverse vertical section on line $x^5$—$x^5$ of Fig. 3.

Fig. 6 is a vertical section through a modified form of control unit.

In the ordinary method of inflating tires the coupling at the end of the air hose must be held on the tire valve stem and when the operator believes the tire has been sufficiently inflated he removes the coupling and applies a tire gage to determine the pressure in the tire. If said pressure is not of the degree required the coupling must again be applied to the tire valve stem and the tire further inflated. The present device eliminates this repeated alternate application of the coupling and tire gage and provides means for releasing excess pressure and also makes provisions for preventing over inflation by air leaking past the closed air supply valve.

Of course, applicant is aware of the various devices which have previously been patented, covering combined couplings and tire gages as integral units, and it will here be noted that these integral devices are not adapted for use with the general types of automobile wheels in which the head-room between the spokes is barely sufficient to permit the use of the well known "Schrader" type of tire gage which is the most compact gage now on the market, and to combine this gage with a coupling and other control mechanism as an integral unit would increase its size to an extent such as would prohibit its use directly on the tire valve stem.

Also, with the standard types of disc wheels the tire valve stem is exposed and accessible only through a relatively small window in the side of the wheel, said window being of a size which is barely sufficient to permit the insertion of the standard hose tip coupling.

With applicant's device, the coupling may be attached to the tire valve stem of disc or other types of wheels and the tire inflated to the desired degree without again disconnecting said coupling until the inflating is completed.

In the drawings, 1 designates a disc type of automobile wheel having the window opening 2 affording access to the tire valve stem of the tire 3. A coupling head 4 is connected to a flexible conduit 5 which is connected at its opposite end to a valve device indicated generally by the reference character 6, and connected to an air supply conduit 7.

The valve device comprises a body 10 having a tubular projection 11 to which the air supply hose is connected by a suitable clamp 12. A hose nipple 13 is screw-threaded into the body 10 and the flexible conduit or hose 5 is attached thereto by suitable clamps 14, 15. Above the hose nipple 13 the body 10 has a bore which is longitudinally parallel with the hose nipple and in which is positioned a pressure gage 16. Said gage comprises a tubular casing 17 in which is slidably mounted an indicator sleeve 18 adapted to be translated by an expansion element and bearing indicating characters or figures on three sides of its peripheral surface to be exposed beyond the body wall and indicating different degrees of pressure, preferably in pounds per square inch. A coil spring 19 is positioned within the sleeve 18, one end thereof being attached to a spring anchor member 20 fixed to the outer end of the sleeve by tangs 21 which extend through orifices in the head of the sleeve and are bent over, as shown in Fig. 3. The opposite end of the spring 19 is fixed to a threaded bushing 22 screw-threaded into the inner end of the sleeve 18. A rubber expansion tube 24 extends into the coil spring 19 and has a closed outer end, and a flanged inner end 25 and in assembling the gage within the body the flanged end 25 seats on the body at the base of the bore therein, a washer 26 being positioned between said flange and the threaded bushing 22 and inner end of the tubular casing 18, with the casing maintained in clamping engagement therewith by a threaded bushing 27 which has a screw-threaded engagement within an outer enlarged portion of the bore and engages a shoulder formed on the outer end of the casing.

In operation, compressed air entering the expansion tube 24 expands said tube to engage its side walls with each convolution of the spring and elongates the tube to forcibly translate the indicator sleeve 18 outwardly to varying degrees depending upon the pressure applied. The spring 19 being anchored to the stationary threaded bushing 22 and to the sleeve 18, through the anchor member 20, serves to retract the indicator sleeve 18 coincident to a decrease in the applied pressure.

Adjacent to and communicating with the bore of the tubular hose connection 11, is a chamber 30 formed to provide a valve seat 31 with which cooperates a ball valve 32, as a main air supply valve, the ball being yieldingly maintained in closed position by a coil spring 33 which engages the ball and seats in a recess formed in a plug member 34 screw-threaded into the body in alignment with the chamber 30. Immediately beyond the main valve 32, the body is bored to provide a second chamber 35 which communicates through a lateral passage 36 and vertical passage 37, with the bore of the hose nipple 13, communication between the passage 36 and the passage 37 being controlled by a ball check valve 38 which is yieldingly maintained on its seat by a spring 39, and serves to prevent a backward escape of the air from the passage 37 to the passage 36. The upper portion of the passage 37 communicates by a port 40, with the rubber expansion tube 24, said port being of a reduced diameter so that during an inflating of a tire the full supply line pressure will not be suddenly applied to the pressure indicator or gage.

The means for operating the main air supply valve 32 comprises a stem formed of two sections 42, 43 separated by a packing 44, of leather or other suitable material, the stem being aligned with the ball valve 32 with its outer end extending exteriorly of the body and positioned for engagement by an operating lever 45 pivoted on the body at 46. The stem section 42 has a sliding fit in the body and the stem section 43 fits loosely therein, its top end having a rounded peripheral edge which provides a peripheral wedge pocket into which is forced the edge of the packing 44, this increasing the efficiency of the packing.

An escape port 47 leads from the bore in which the stem is positioned, to the atmosphere, the purpose of this construction being to provide means for by-passing air which may escape past the valve 32 when closed, to the atmosphere instead of allowing it to over-inflate a tire. For instance, if the tire has been sufficiently inflated and the operator is called away or neglects to disconnect the coupling 4 from the tire valve stem, and the main air valve 32 did not properly close, the air leaking past said valve would tend to over-inflate the tire unless allowed a free escape to the atmosphere. In the present construction the air escaping past the valve 32 flows upwardly around the loosely fitting stem section 43 and forces the stem and packing upwardly to uncover the port 47 allowing the escaping air to exhaust to the atmosphere, the pressure required to translate the stem being less than that required to unseat the check valve 38.

To control a condition wherein a tire has been over-inflated, I provide an independent means for escaping air from the tire until the pressure therein is reduced to the proper degree, such means comprising a valve 50 which engages a valve seat 51 formed on the inner end of a bushing 52 which is screw-threaded into the body in alignment with the check valve 38. This valve has a stem 53 which fits loosely in the bore of said bushing and the valve 50 is yieldingly held on its seat by the spring 39. When it is desired to release air from the tire the valve stem 53 is pressed inwardly to unseat the valve 50 allowing the air to escape from the passage 37 past said valve, around the loosely fitting valve stem 53 and to the atmosphere.

As a protection for the valve device I provide a rubber collar 55 secured on the inner end of the hose 7 adjacent the body 10, and a rubber collar 56 secured around the opposite end of the body and around the hose 5, as shown.

In use, the coupling head 4 is attached to a tire valve stem, as indicated in Fig. 1, the coupling serving in the usual manner to unseat the tire valve. In this instance a portion of the air in the tire will flow back into the conduit 5, through the vertical passage 37 and through the port 40 to the bore of the tubular expansion element 24 of the pressure gage and a reading may then be had of the degree of pressure in the tire.

If the tire requires inflating, the operating handle 45 will be depressed, engaging the stem 43 and causing the stem section 42 to unseat the main air supply valve 32. The compressed air will then flow through the chamber 35, passage 36, unseating the check valve 38, and through the passage 37 to the conduit 5 and to the tire. A portion of the compressed air also flows through the port 40 and to the gage to give a reading of the air pressure being entrained to the tire. During the unseating of the main air supply valve 32, the packing 44 will be moved downwardly to close the by-pass escape port 47, if said packing had previously been moved upwardly to uncover said port. The area of the passage through the hose projection 11 is of a suitable restricted size as indicated at 11$^a$ as will cut down the pressure to a limit which will not be injurious to the valve mechanism or gage.

This restricted inlet orifice 11$^a$ is necessary in the event that the pressure of the air supply in the hose 7 is greater than the gage will stand. The pressure in the air line of modern garages is often in excess of 200 pounds and the rubber expansion tube 24 which is similar to the rubber tube of the ordinary tire gage cannot be subjected to such a high pressure without blowing out. Therefore, the provision of the restricted orifice 11$^a$ is necessary to cut down the pressure of the flowing air to a point within the limit of strength of the rubber expansion tube.

When it is believed that the tire has been sufficiently inflated the operating handle 45 is released and the spring 33 will act to seat the main air supply valve cutting off the air supply, after which the gage will correctly register or indicate the tire pressure. If the tire is not sufficiently inflated the lever 45 will again be depressed and the operation repeated until a proper tire pressure is obtained, when the hose coupling 4 will be removed from the tire valve stem. If the tire is found to be over-inflated, the operator depresses the stem 53 of the release valve 50 to release sufficient air to bring the tire pressure down to the required degree.

With this device a convenient gage reading may be had regardless of the circular position of the tire valve stem as the flexible conduit 5 permits the gage being turned to bring the indicating characters thereof to a proper reading position. This differs from the reading of the ordinary form of tire gage and of a device in which the coupling 4 would be combined as an integral unit with a control valve, wherein if the wheel were positioned with tire valve stem upwardly the gage would be upside down as would the indicating characters.

Fig. 6 illustrates a valve which, though modified as to specific details, includes all the features of the valve above described and is more specifically designed for attachment directly to the stationary air supply device or pipe line.

In this form, the body 60 has a chamber 61 which corresponds to the passage 37 of the previously described device, having communication with a standard type of dial gage 62, and provided with an escape valve 63 similar to the escape valve 50 and functioning in the same manner. The chamber communicates with the flexible conduit 64 leading to the tire coupling (not shown in this figure) and also communicates with a passage 65 controlled by a check valve 66 which has the same function as does the previously described check valve 38.

The main air supply valve is constructed differently than the valve 32 above referred to and combines a disc valve 67 having a guide stem 68 and an opposed operating stem 69. The valve 67 cooperates with a valve seat 70, preferably of rubber, which seats on a bushing 71, the bushing having a central port 74 through which the valve operating stem 69 projects and which is larger than said stem affording an air passage. The bushing 71 engages a packing 72 closely engaging the valve stem 69, and maintains said packing in place at the base of the bore forming the valve chamber 61 said bushing having a port 73 establishing communication between the port 74 and the passage 65. The coengaging parts, the packing 72, the bushing 71 and the valve seat 70, are clamped upon each other and maintained in position by a bushing 75 having a screw-threaded engagement in the valve chamber bore and the valve 67 is yieldingly maintained in closed position by a spring 76 engaging said valve and seated against the end wall of a recess in the bushing 75. The guide stem 68 slides in the air passage of the bushing and is slotted as at 77 to permit the passage of air to the valve chamber.

The valve operating stem 69 has a passage 80 open at its outer end and communicating with the passage 65 through the port 73 and chamber 61, the outer end of the operating stem 69 being closed by a cap 81, loosely engaging over said stem and containing a valve packing 82 closing the passage 80.

The operating handle 83 is pivoted at 84 and has a nose aligned with the stem of the escape valve 63 and the entire device is supported directly on the compressed air supply tank or pipe line by being connected thereto by suitable pipe fittings as indicated at 85.

In operation, the handle 83 is rocked in a clockwise direction in Fig. 6, maintaining the cap 81 upon the operating stem 69 with the valve packing 82 closing the by-pass passage 80, the handle functioning to unseat the main air supply valve 67. To escape air from an over-inflated tire the handle 83 is reversely rocked to engage and operate the escape valve 63, and, if the main air valve 67 does not seat properly when closed, the air leaking past said valve flows through the by-pass passage 80, unseating the valve packing 82, and flowing between the stem 69 and the loosely fitting cap 81, escapes to the atmosphere. Thus it will be seen that the control device illustrated in Fig. 6 is of an equivalent construction and functions in the same manner as does that illustrated in Figs. 1 to 5.

I claim:

1. In a device of the class described, a body having an inlet passage and an outlet passage, a main valve controlling communication between said passages, means for unseating said valve, a pressure gage communicating with the outlet passage, an automatic back-pressure check valve in the outlet passage preventing a backward flow of air from the outlet to the main valve, and means between the main valve and the check valve for by-passing air leaking past the closed main valve to the atmosphere.

2. In a device of the class described, a body having an inlet passage and an outlet passage, a main valve controlling communication between said passages, an automatic back-pressure check valve in the outlet passage preventing a backward flow of air from the outlet to the main valve, the body having a port communicating with the outlet passage intermediate the valves and open to the atmosphere, and means simultaneously opening the main valve and closing said port.

3. In a device of the class described, a body having an inlet passage and an outlet passage, a main valve controlling communication between said passages, a pressure gage communicating with the outlet passage, an automatic back-pressure check valve in the outlet passage preventing a backward flow of air from the outlet to the main valve, means beyond the check valve for releasing air from the outlet passage and the gage, to the atmosphere, means between the check valve and the main valve for releasing air leaking past the closed main valve, to the atmosphere, and means for opening the main valve.

4. A device adapted to be positioned as a part of a flexible conduit leading from an air pressure reservoir for inflating pneumatic tires, said device comprising a casing having a normally automatically closed main valve for controlling the passage of air through said conduit, an air vent valve communicating with the atmosphere on the outlet side of said main valve for permitting the escape of air from a tire to which said conduit is coupled, a main valve operating lever pivoted to said casing and adapted to be actuated by a hand grasping said casing, a vent valve operating button adapted to be actuated by the thumb of the hand grasping the casing, when said hand is in position for actuating said main valve operating lever, and an air gage carried by said casing and communicating with said conduit on the outlet side of said main valve, said air gage being positioned parallel to said conduit and projecting from between the thumb and forefinger of the hand grasping said casing in the manner stated.

5. A device adapted to be positioned in a flexible conduit connected with an air pressure reservoir for inflating pneumatic tires, said device comprising a casing having a main valve for controlling the passage of air through said conduit, an air vent valve for permitting escape of air to the atmosphere from a tire to which said conduit is coupled, said device being so constructed that when grasped by a hand the said main valve may be actuated by the palm of the hand and the air vent valve actuated by the thumb of the said hand, said casing including a tire gauge for indicating the pressure of the tire to be inflated.

6. A device adapted to be positioned in a flexible conduit connected with an air pressure reservoir for inflating tires, said device comprising a body having a main valve for controlling the passage of air through said conduit, automatic means for maintaining said main valve normally closed to prevent the passage of air from said reservoir, a pressure gage in said body on the outlet side of said main valve, an independent air vent valve also on the outlet side of said main valve, automatic means for normally maintaining said air vent valve closed, manual operating means for opening said main valve, and manual operating means for opening said air vent valve, said two last-named manual operating means being independent of each other.

Signed at Los Angeles, California this 12th day of May, 1920.

JAMES F. KEY.

Witnesses:
CLARENCE B. FOSTER,
L. BELLE WEAVER.